United States Patent
Liao et al.

(10) Patent No.: US 9,442,883 B2
(45) Date of Patent: Sep. 13, 2016

(54) STRUCTURED NETWORK TRAFFIC DATA RETRIEVAL IN VAST VOLUME

(71) Applicants: James Liao, Palo Alto, CA (US); Lin Du, Beijing (CN); David Liu, Livermore, CA (US)

(72) Inventors: James Liao, Palo Alto, CA (US); Lin Du, Beijing (CN); David Liu, Livermore, CA (US)

(73) Assignee: PICA8, INC., Palo Alto, CA (US)

(*) Notice: Subject to any disclaimer, the term of this patent is extended or adjusted under 35 U.S.C. 154(b) by 350 days.

(21) Appl. No.: 13/971,707

(22) Filed: Aug. 20, 2013

(65) Prior Publication Data

US 2015/0058434 A1 Feb. 26, 2015

(51) Int. Cl.
*G06F 15/167* (2006.01)
*G06F 15/173* (2006.01)

(52) U.S. Cl.
CPC .............. *G06F 15/17331* (2013.01)

(58) Field of Classification Search
CPC ................................. G06F 15/17331
USPC ............................................ 709/212
See application file for complete search history.

(56) References Cited

U.S. PATENT DOCUMENTS

2006/0129742 A1* 6/2006 Tatapudi ............... G06F 13/28
711/5

* cited by examiner

*Primary Examiner* — Ario Etienne
*Assistant Examiner* — Sahera Halim
(74) *Attorney, Agent, or Firm* — Blakely, Sokoloff, Taylor & Zafman LLP

(57) ABSTRACT

A method and apparatus are disclosed herein for retrieving network traffic data. In one embodiment, a networking apparatus comprises a memory; a network device; and a processing unit coupled to the network device and the memory. The processing unit is operable to execute a data engine that performs bulk data transfers from the network device periodically into a data buffer in the memory and translates data received from the network device, based on a mapping definition, into a user defined format for export to one or more applications running on networking apparatus.

18 Claims, 7 Drawing Sheets

STRUCTURED NETWORK TRAFFIC DATA RETRIEVAL IN VAST VOLUME

FIELD OF THE INVENTION

Embodiments of the present invention relate to the field of networking devices; more particularly, embodiments of the present invention relate to the transfer of network data from a network device to applications and file services requesting such data.

BACKGROUND OF THE INVENTION

In today's networking environment, network users, including mega data centers, enterprises, and telecommunication companies, require the traffic data from a networking device in order to optimize their applications. The network data in which the network users are interested includes port status, traffic volume, error rate, and queue depth, as well as other data statistics.

The traffic data is collected and stored in network devices, such as network ASICs. When network users need the data, they issue commands through one or more SNMP, CLI, or Web interfaces to retrieve the data from ASIC, one data element at a time. This used to be acceptable, but it cannot scale with the amount of data that generated from the devices today.

SUMMARY OF THE INVENTION

A method and apparatus are disclosed herein for retrieving network traffic data. In one embodiment, a networking apparatus comprises a memory; a network device; and a processing unit coupled to the network device and the memory. The processing unit is operable to execute a data engine that performs bulk data transfers from the network device periodically into a data buffer in the memory and translates data received from the network device, based on a mapping definition, into a user defined format for export to one or more applications running on networking apparatus.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
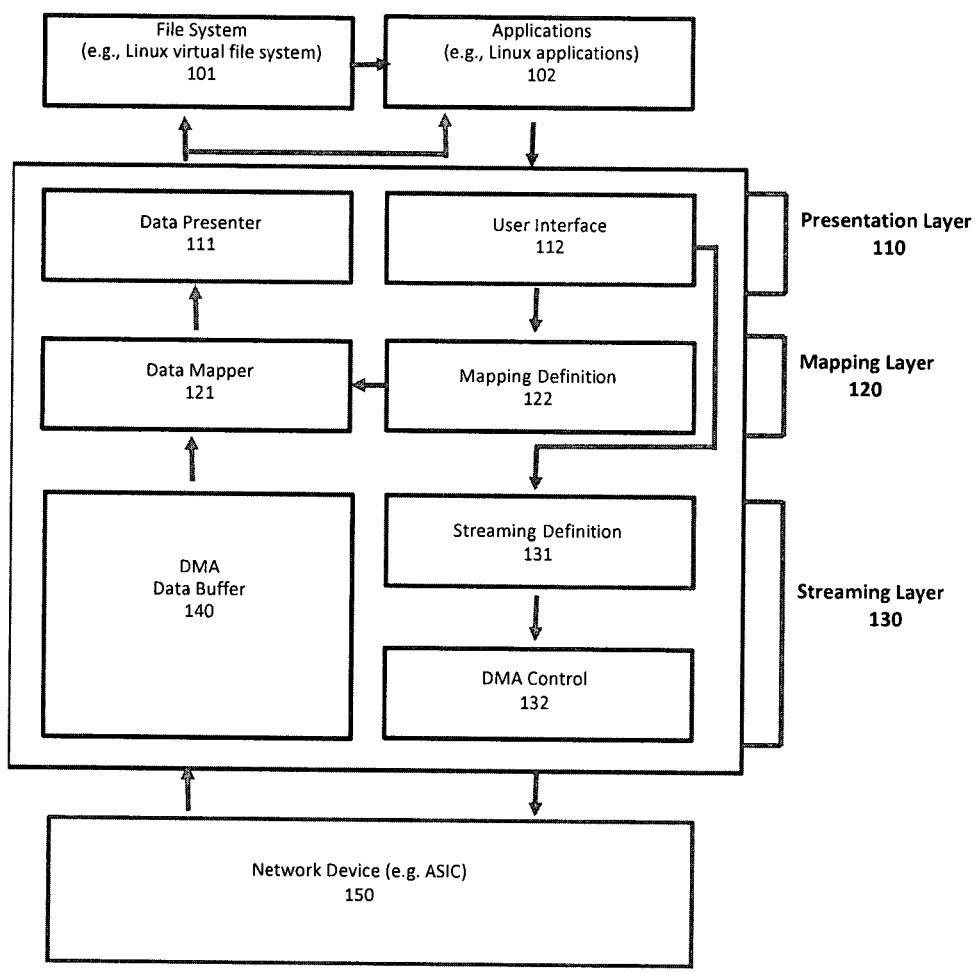
FIG. 1 illustrates a layered network traffic data engine to retrieve network data in vast volume.

A networking apparatus for use in a network is described. In one embodiment, the networking apparatus comprises a memory, a network device, and a processing unit coupled to the network device and the memory. The processing unit is operable to execute a data engine that performs bulk data transfers from the network device periodically into a data buffer in the memory and translates data received from the network device, based on a mapping definition, into a user defined format for export to one or more applications running on networking apparatus. In one embodiment, a bulk data transfer is a transfer of all or a large amount of device (e.g., ASIC) data directly from the device to a memory of another device (e.g., a CPU memory) in one transaction by specifying a range of data to be exported through the bulk data transfer mechanism (e.g., ASIC DMA mechanism) (as opposed to retrieving one data item at a time). In one embodiment, the data includes ASIC data in counters for all physical switch ports, L2/L3 tables, and queues/packet buffers of an ASIC. This data collection process can be repeated any number of times automatically to record a large amount of data for an application to process.

In one embodiment, the data engine is operable to configure a bulk data transfer mechanism of the network device to stream data from the network device to the data buffer at a user specified time interval. In one embodiment, the data engine, when executing a streaming definition module, receives a data object definition associated with data from the network device, data buffer location information, and a data streaming frequency from a user interface that is part of the data engine and programs the bulk data transfer mechanism based on this information. In one embodiment, the data engine, in response to the data object definition, the data buffer location information, and the data streaming frequency from the user interface, translates data from the network device into physical table names, counter names and register names. In one embodiment, the data engine receives a mapping definition and includes a data mapper that uses the mapping definition to map data from the network device to the user defined format.

In one embodiment, the bulk data transfer mechanism comprises a direct memory access (DMA) data transfer mechanism, and the data buffer receives DMA transferred data. In one embodiment, the user specified interval is received by the data engine from an application using a user interface.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 illustrates a layered network traffic data engine to retrieve network data in vast volume. Referring to FIG. 1, data engine 103 is coupled to file system 101 and applications 102. In one embodiment, file system 101 comprises a Linux virtual file system and applications 102 comprise one or more Linux applications. Data engine 103 is also coupled to network device 103. In one embodiment, network device 103 comprises an Application Specific Integrated Circuit (ASIC) that operates as a network switch. In one embodiment, network device 103 may comprise a network router, a gateway, a security appliance, etc.

In one embodiment, data engine 103 comprises three layers and multiple interfaces that can be executed on one or multiple central processing units (CPUs) to control one or multiple network devices (e.g., ASICs). The three layers are a data streaming layer 130, a data mapping layer 120, and a data presentation layer 110.

In one embodiment, streaming layer 130 comprises a streaming definition module 131, a direct memory access (DMA) control module 132, and DMA data buffer 140. In one embodiment, DMA data buffer 140 is part of a CPU memory.

Streaming definition module 131 receives an ASIC data object definition, a CPU DMA data buffer location; and a streaming frequency from user interface module 112 of presentation layer 110 and then translates the provided information into parameters passed to the Application Program Interface of network device 150 (e.g., the ASIC). For example, the data can be identified by physical table names, counter names, register names and ranges (e.g., starting and ending register addresses or offsets) for DMA control module 132 to program the DMA bulk data transfer interface of network device 150.

DMA control module 132 receives a streaming definition from streaming definition module 131 and then configures a DMA data transfer mechanism of network device 150 to stream data from network device 150 to DMA data buffer module 140. In one embodiment, DMA control module 132 implements a DMA control loop that retrieves data from network device 150 based on a user specified timing interval. Such a timing interval may be periodic. In one embodiment, the DMA control configures the DMA transfer through ASIC Application Program Interface provided by the ASIC vendor Software Development Kit (SDK). The data engine specifies the target ASIC data items (e.g., counters, tables, FIFO, registers), address ranges (e.g., starting and ending addresses), transfer intervals, and destination memory buffer address. The above configuration is set into the ASIC and the transfers are made based on the specified intervals.

DMA data buffer module 140 is a buffer area in a memory (e.g., a CPU memory) managed by data engine 103 to receive DMA transferred data from network device 150. In one embodiment, DMA data buffer module 140 is a shared memory accessible by data streaming layer 130 and data mapping layer 120 in a non-blocking fashion such that both data streaming layer 130 and data mapping layer 120 can access DMA data buffer module 140 at the same time.

In one embodiment, data mapping layer 120 comprises mapping definition module 122 and data mapper module 121. Mapping definition module 122 receives a user defined data format from user interface module 112 of presentation layer 110 for use in translating the raw data from network device 150 into a user defined data format for data presenter 111 of presentation layer 110 to store or export at least portions of the data to one or more applications, such as for example applications 102. In one embodiment, the mapping reduces the amount of data to be transferred to applications or users by selecting a subset of ASIC data to be transferred to applications or users. In one embodiment, by default, all data are mapped to a default data model for data presenter 111 of presentation layer 110 to export the data to a file system interface to communicate with file system 101. In one embodiment, mapping definition 122 is a hierarchical data definition with name and value pairs, is stored in data engine 103 and is assessable by data mapper module 121.

Data mapper module 121 maps the data from network device 150 to a user defined format based on mapping definition 122. In one embodiment, a default format based on a default data model is always generated.

In one embodiment, data presentation layer 110 comprises a user interface module 112 and a data presenter module 111. User interface module 112 receives a user input for mapping and streaming configuration and checks the syntax and semantics of the user input to ensure it is a correct specification. In one embodiment, the user input is stored in internal data structure that is shared among internal modules of data engine 103. Data presenter module 111 exports the mapped data in default format to file system 101 (e.g., Linux Virtual file system /proc) and presents data in a user defined format to user applications 102. In one embodiment, data presenter module 111 exports the data to a Linux Virtual file system using a /proc interface, which is a kernel driver interface, and to a Linux application using a socket interface.

In one embodiment, in operation, a network device, such as network device 150, creates and stores data corresponding to network traffic that passes through it. The data corresponds to statistics regarding the data that passes through the network device. In one embodiment, data corresponding to each port of the network device is stored in a memory in the network device. The data may be count values from counters keeping track of certain statistics, such as the number of packets processed, the number of packets dropped, etc. Thus, as packets come into the network device, statistics are generated and stored in memory of the network device.

In one embodiment, this data is logically grouped together, even though it may be physically scattered in a memory in or accessible to network device 150. Locations in the memory of the network device may be mapped to each of the ports of the network device. In such a case, counters and/or statistics for each of the specific ports are stored in certain locations in the memory of the network device.

In one embodiment, the data stored in network device 150 is transferred to data streaming layer 130 of data engine 103 using a DMA bus interface as part of a bulk transfer operation. These bulk transfer operations occur repeatedly over time to stream the data from the network device to the data engine. In one embodiment, this can occur in the time interval between minimum 10 milliseconds to a maximum of every 15 minutes.

In response to receiving the data, data streaming layer 130 stores the data in DMA data buffer 140.

Data mapper 121 maps the data into a format based on the application (e.g., application 102) to which the data is being sent. The format may dictate that only certain information provided by network device 150 is to be provided to the application. For example, an application may only desire data from a subset of the counter values (e.g., number of packets dropped at a particular port, number of packets dropped at a particular flow, etc.) provided by network device 150. In such a case, before data mapper 121 maps the data, one of applications 102 identifies the data that it desires, how often it wants the data, and selects an action to be performed on the data. The action may be a recovery action, generating a report, performing certain analysis on the data, etc. Note that the action selected by the application does not need to be specified to the data engine. The same information could be specified by one or more other applications.

In response to mapping the data, data presentation layer 103 obtains the data desired by the application and provides the data with the mapping specified by the application to an interface (e.g., a IP interface, a web interface, a file interface, etc.) to present the mapped data to the applications and/or the file system.

Figure 2:
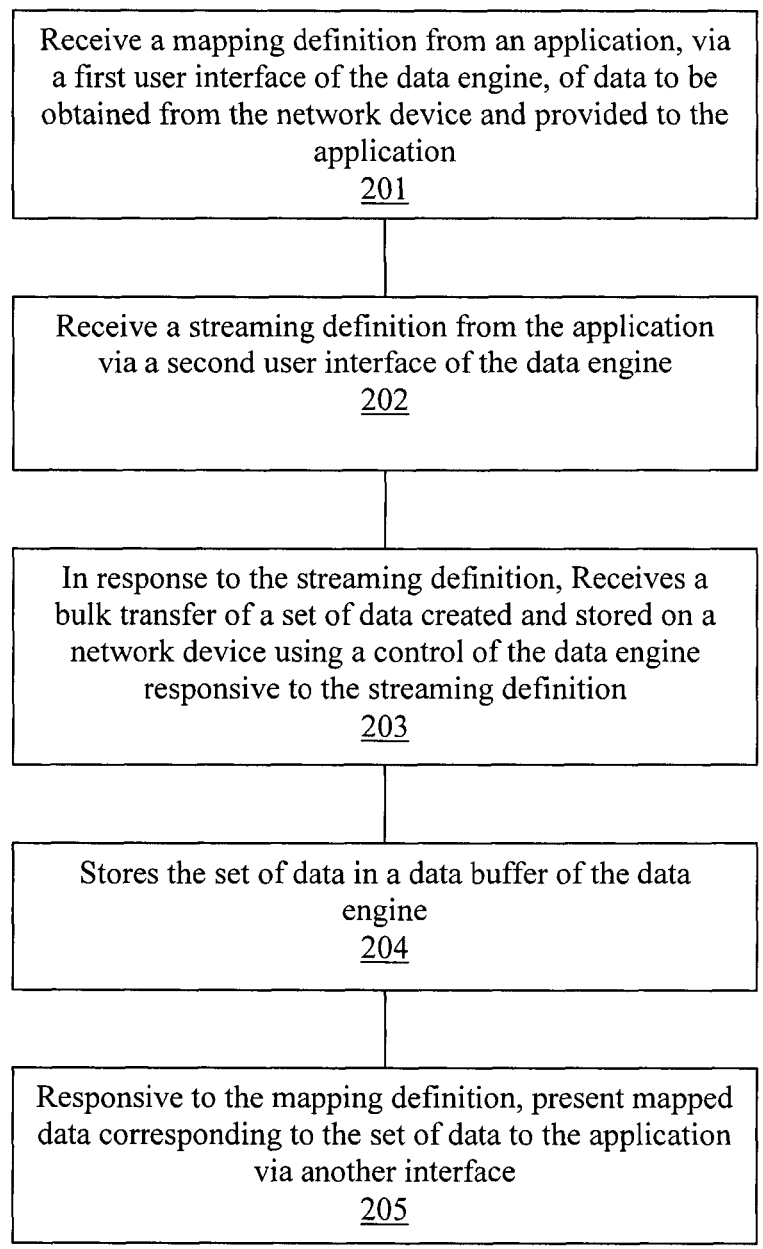
FIG. 2 is a flow diagram of one embodiment of a process illustrating use of the data engine.

FIG. 2 is a flow diagram of one embodiment of a process illustrating use of the data engine. The process is performed by processing logic that may comprise hardware (circuitry, dedicated logic, etc.), software (such as is run on a general purpose computer system or a dedicated machine), or a combination of both.

Referring to FIG. 2, the process begins by processing logic receiving a mapping definition from an application, via a first user interface of the data engine, of data to be obtained from the network device and provided to the application (processing block 201). In one embodiment, the mapping definition specifies translation of network device data into a user defined data format.

Processing logic also receives a streaming definition from the application via a second interface of the data engine (processing block 202). In one embodiment, the streaming definition specifies data from the network device that is to be streamed via the data engine to the application and a streaming frequency indicating how often the data is to be streamed. In one embodiment, the streaming definition comprises a data object definition and a data buffer location for the data buffer of the data engine. In one embodiment, the first and second user interfaces are the same interface.

In response to the streaming definition, processing logic receives a bulk transfer of a set of data created and stored on a network device using a control of the data engine responsive to the streaming definition (processing block 203) and stores the set of data in a data buffer of the data engine (processing block 204). In one embodiment, receiving the bulk transfer of a set of data created and stored on a network device is performed using a DMA data transfer mechanism and the set of data is received using a DMA bus interface of the data engine. In one embodiment, the bulk transfer of the set of data is repeated periodically according to the time interval.

Thereafter, responsive to the mapping definition, processing logic presents mapped data corresponding to the set of data to the application via another interface (processing block 205). In one embodiment, the third interface comprises a TCP interface, a web interface, or a file system interface.

One Embodiment of a Data Model for a Network Device

In one embodiment, a data model for network device 150 contains counters, tables, and registers. It is a hierarchical data model in which each data group consists of sub-groups and individual data items. The model is described by a data definition language JSON. A sample data schema is provided below.

The data schema is used by the streaming definition module 131 to identify data from network device 150 that needs to be transferred by a DMA (or other type of transfer) to data engine 103. It is also used by mapping definition module 122 to select the data to be mapped for the application.

```
{
    "ASIC Data Model": {
        "Counters": {
            "GE MAC": {
                "Rx Frame": "value",
                "Rx Byte": "value",
                "Rx MC Frame": "value",
                "Rx BC Frame": "value",
                "Rx Ctrl Frame": "value",
                "Rx Pause Frame": "value",
                "Tx Frame": "value",
                "Tx Byte": "value"
            },
            "XAUI MAC": {
                "TX Pkt": "value",
                "Tx Byte": "value",
                "Tx Err": "value",
                "Rx Pkt": "value",
                "Rx Byte": "value",
                "Rx Err": "value"
            },
            "Switching Rx": {
```

-continued

```
        "IPv4 Discard": "value",
        "IPv4 UC Frame": "value",
        "IPv4 Hdr Err": "value",
        "IPv6 Discard": "value",
        "IPv6 UC Frame": "value",
        "IPv6 Hdr Err": "value"
    },
    "Switching Tx": {
        "Tx Pkt": "value",
        "Drop Pkt": "value",
        "PerQ Per Port Tx": "value",
        "TX VPI": "value"
    },
    "Buffer Discard": {
        "Egr Port HOL": "value",
        "Drop Pkt": "value",
        "Drop Byte": "value",
        "PerQ PerPort Pkt Ingr Congestion": "value",
        "PerQ PerPort Byte Ingr Congestion": "value",
        "IPv6 UC Frame": "value",
        "IPv6 Hdr Err": "value"
    }
},
"Tables": {
    "Port Table": [
        {
            "L2 Learning": "value",
            "VLAN Handling": "value"
        }
    ],
    "VLAN Table": [
        {
            "Port Membership": "value",
            "STP Group": "value"
        }
    ],
    "LAG Group Table": [
        {
            "Port Membership": "value",
            "LAG": "value",
            "Hash Selection Criteria": "value"
        }
    ],
    "L3 Host Route Table": [
        {
            "IP": "value",
            "Route": "value"
        }
    ],
    "L3 LPM Route Table": [
        {
            "IP Subnets": "value",
            "ECMP": "value",
            "Route": "value"
        }
    ],
    "L3 Tunnel Table": [
        {
            "Tunnel Type": "value",
            "Sourec IP": "value",
            "Destination IP": "value"
        }
    ]
},
"Registers": { }
}
```

Alternative System Architectures

Figure 4:
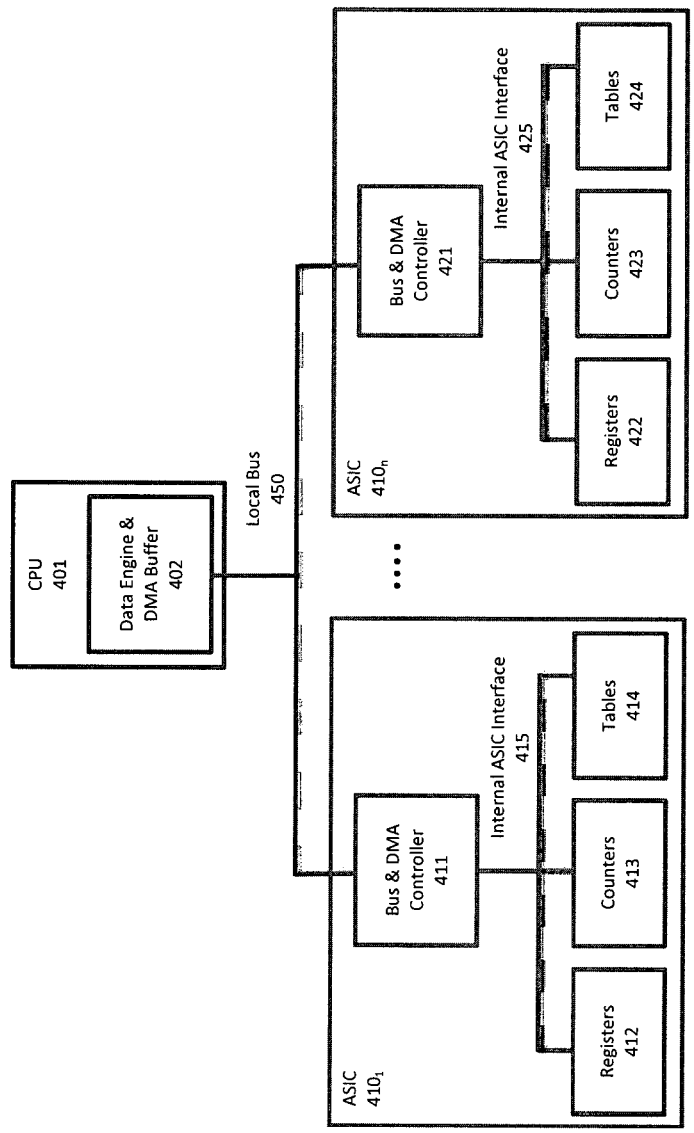
FIG. 4 illustrates a networking apparatus having one CPU controlling multiple ASICs directly through a local bus.
Figure 5:
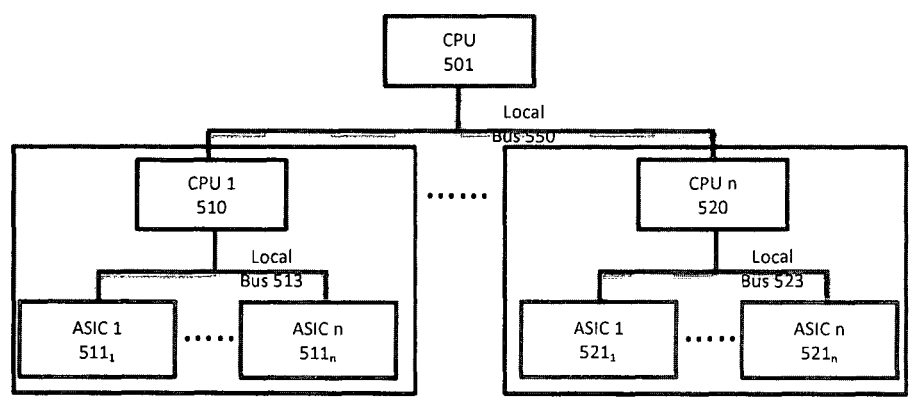
FIG. 5 illustrates a networking apparatus having one CPU controlling multiple CPUs, which in turn control one or multiple ASICs.

In one embodiment, a networking apparatus can have one more CPUs that execute the data engine to control one or multiple network devices (e.g., ASICs) directly or indirectly through intermediate CPUs. FIGS. 3-5 illustrate example configurations of such networking apparatuses.

Figure 3A:
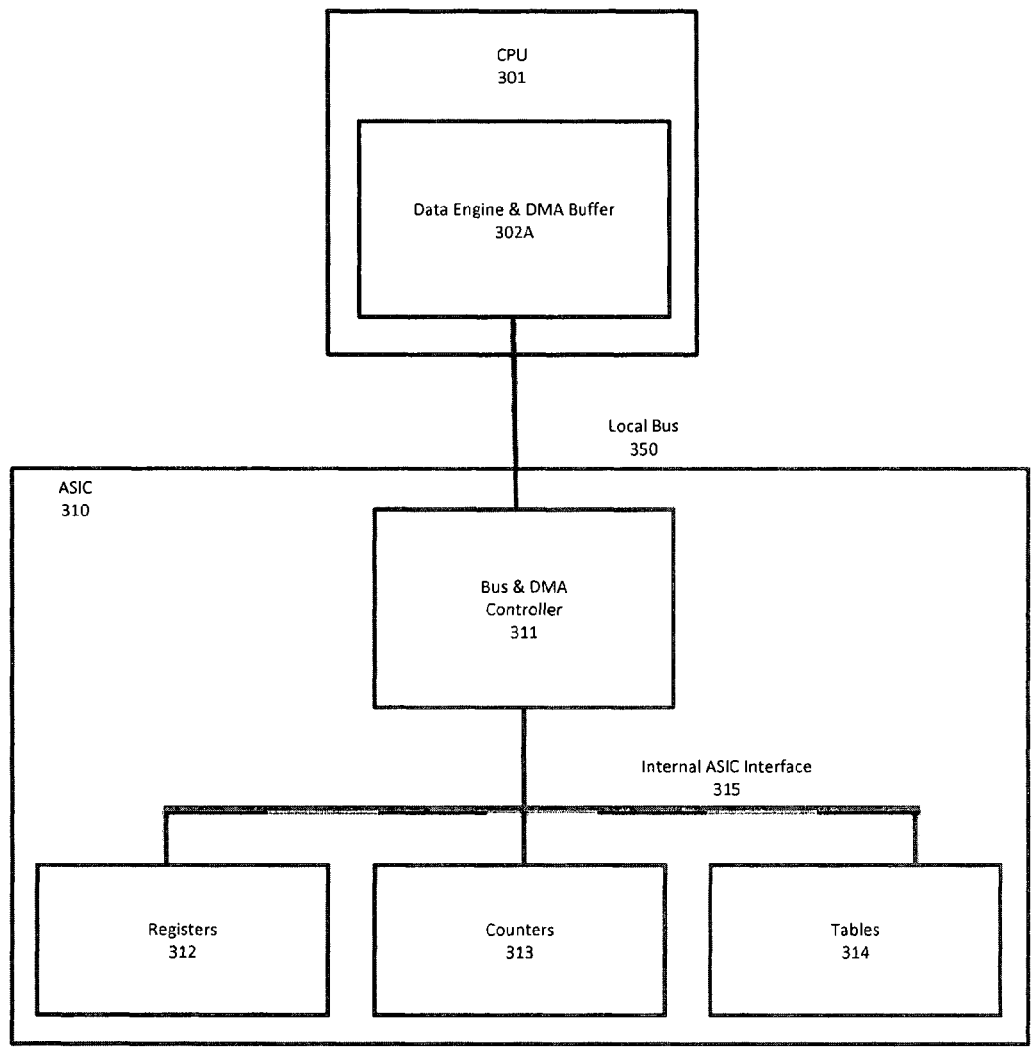
FIG. 3A illustrates a networking apparatus having one CPU controlling one ASIC directly through a local bus.

FIG. 3A illustrates a networking apparatus having one CPU controlling one ASIC directly through a local bus. Referring to FIG. 3A, CPU 301 include data engine 302. Data engine 302 includes a DMA buffer. CPU 301 is coupled to ASIC 310 via local bus 350. ASIC 310 includes registers 312, counters 313, and tables 314 coupled to a bus & DMA controller 311 via to internal ASIC interface 315. Bus & DMA controller 311 interfaces registers 312, counters 313, and tables 314 with local bus 350.

Figure 3B:
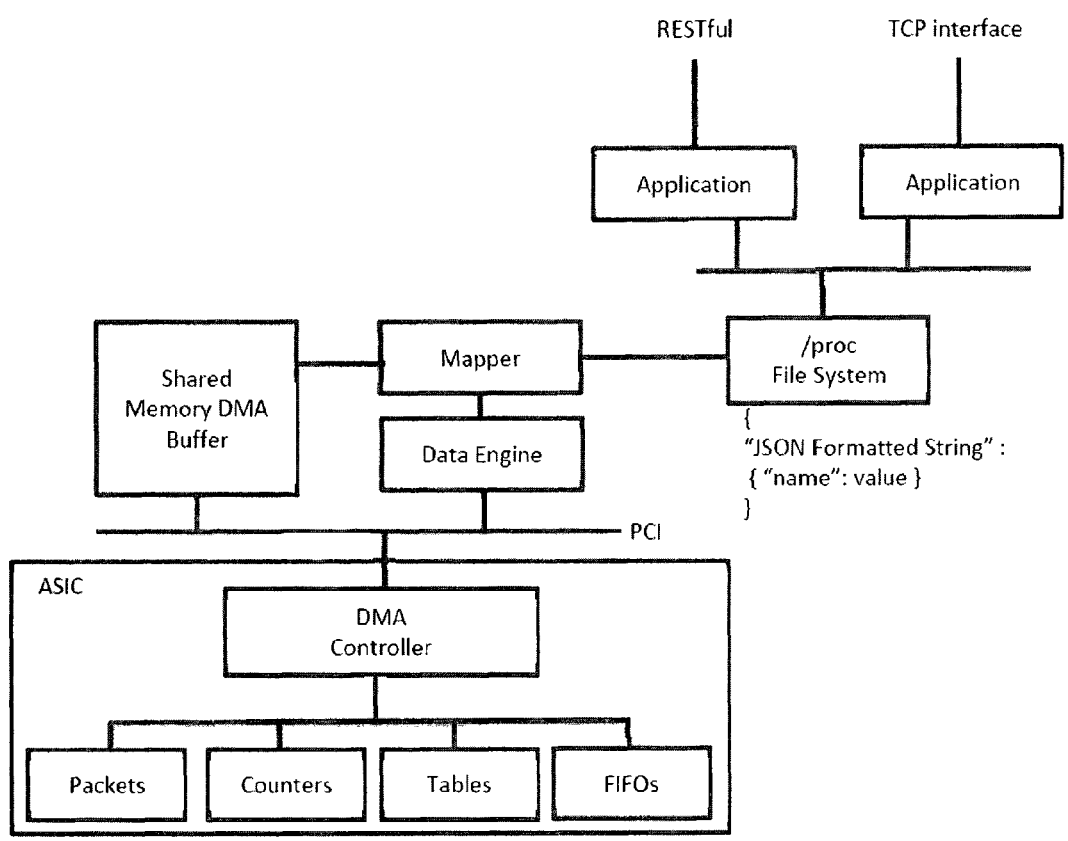
FIG. 3B illustrates a specific embodiment of the networking apparatus of FIG. 3A.

FIG. 3B illustrates a specific embodiment of the networking apparatus of FIG. 3A. Referring to FIG. 3B, the data engine and shared memory (e.g., DMA buffer) are coupled to a PCI Express bus along with the ASIC. A data mapper obtains data from the shared memory and provides it to the file system using a /proc interface. Applications obtain the data from the file system. In one embodiment, these applications include a RESTful interface and a TCP interface.

FIG. 4 illustrates a networking apparatus having one CPU controlling multiple ASICs directly through a local bus. Referring to FIG. 4, CPU 401 include data engine 402. Data engine 402 includes a DMA buffer. CPU 401 is coupled to ASICs 410 and 420 via local bus 450. ASIC 4101 includes registers 412, counters 413, and tables 414 coupled to a bus & DMA controller 411 via to internal ASIC interface 415. Bus & DMA controller 411 interfaces registers 412, counters 413, and tables 414 with local bus 450. ASIC 410n includes registers 422, counters 423, and tables 424 coupled to a bus & DMA controller 421 via to internal ASIC interface 425. Bus & DMA controller 421 interfaces registers 422, counters 423, and tables 424 with local bus 450.

In one embodiment, CPU 401 and ASICs 4101-n are coupled to each other using a chassis based system. In an alternative embodiment, the chassis includes multiple CPUs controlling multiple ASICs.

FIG. 5 illustrates a networking apparatus having one CPU controlling multiple CPUs, which in turn control one or multiple ASICs. Referring to FIG. 5, CPU 501 is coupled to CPUs 510 and 520 via local bus 550. CPU 510 is coupled to ASICs $511_1$-$511_n$ via local bus 513. CPU 520 is coupled to ASICs $521_1$-$521_n$ via local bus 523.

An Example of a Computer System

Figure 6:
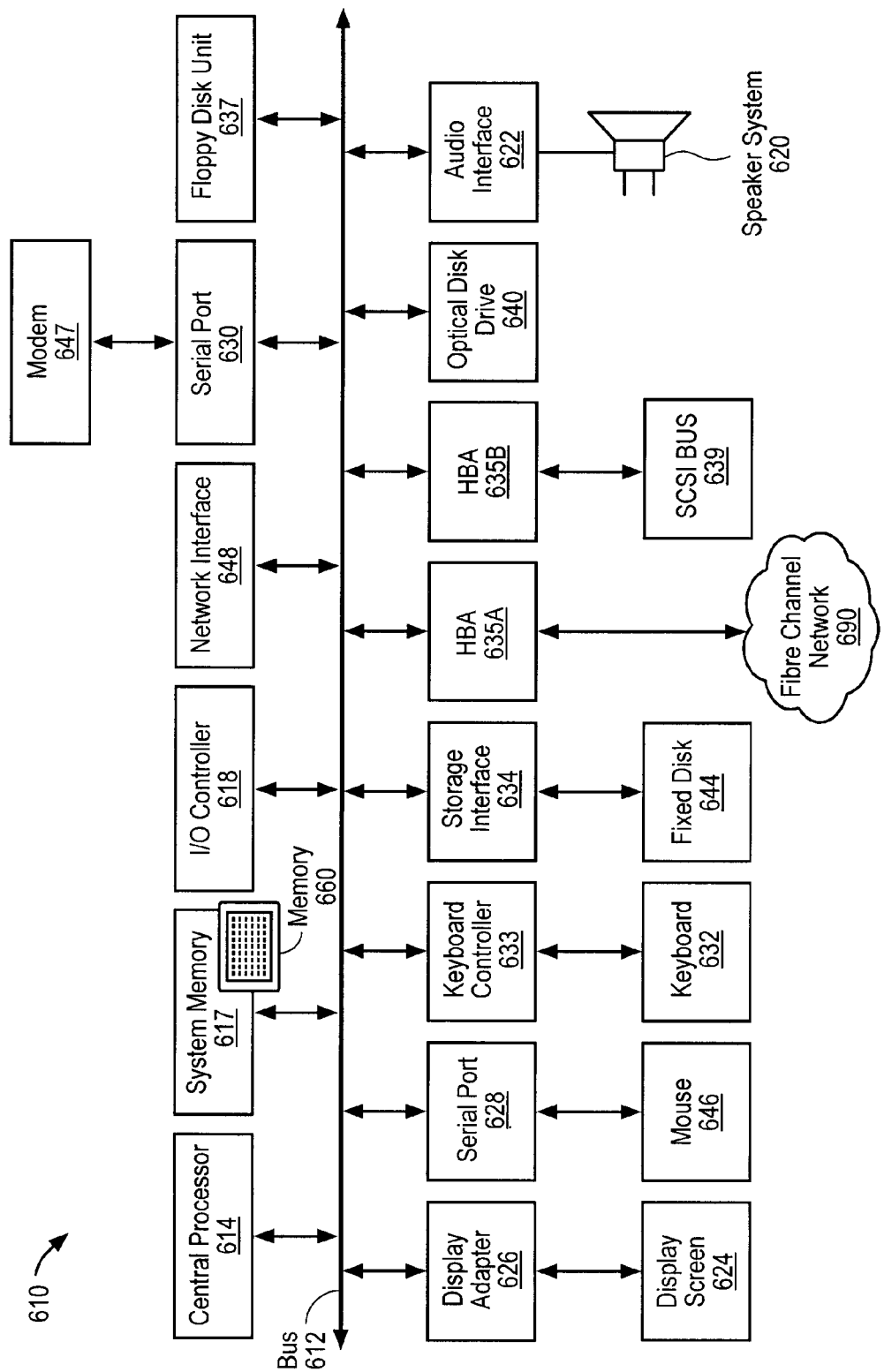
FIG. 6 depicts a block diagram of a system.

FIG. 6 depicts a block diagram of a system that may be used to implement the data engine 103 of FIG. 1. Referring to FIG. 6, system 610 includes a bus 612 to interconnect subsystems of system 610, such as a processor 614, a system memory 617 (e.g., RAM, ROM, etc.), an input/output controller 618, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617. System memory 617 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems.

Modem 647 may provide a direct connection to a remote server via a telephone link or to the Internet via an internet service provider (ISP) (e.g., servers 101, 111-114 of FIG. 1). Network interface 648 may provide a direct connection to a remote server such as, for example, servers 111-114 of FIG. 1. Network interface 648 may provide a direct connection to a remote server (e.g., server 101 of FIG. 1) via a direct network link to the Internet via a POP (point of presence). Network interface 648 may provide such connection using wireless techniques, including digital cellular telephone connection, a packet connection, digital satellite data connection or the like.

Many other devices or subsystems (not shown) may be connected in a similar manner. Conversely, all of the devices shown in FIG. 6 need not be present to practice the techniques described herein. The devices and subsystems can be interconnected in different ways from that shown in FIG. 6. The operation of a system such as that shown in FIG. 6 is readily known in the art and is not discussed in detail in this application.

Code to implement the data engine operations described herein can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A networking apparatus for use in a network, the networking apparatus comprising:
 a memory;
 a network device;
 a processing unit coupled to the network device and the memory, the processing unit operable to execute a data engine that performs bulk data transfers from the network device periodically into a data buffer in the memory and translates data received from the network device, based on a mapping definition, into a user defined format for export to one or more applications running on the networking apparatus, wherein the data engine is operable to configure a bulk data transfer mechanism of the network device to stream data from the network device to the data buffer at a user specified time interval, and further wherein the data engine, when executing a streaming definition module, receives a data object definition associated with data from the network device, data buffer location information, and a data streaming frequency from a user interface that is part of the data engine and programs the bulk data transfer mechanism.

2. The networking apparatus defined in claim 1 wherein the data engine, in response to the data object definition, the data buffer location information, and the data streaming frequency from the user interface, translates the provided information into parameters passed to the network device Application Program Interface (API).

3. The networking apparatus defined in claim 1 wherein the data buffer is part of a CPU memory and the network device comprises an ASIC, and further wherein the bulk data transfer mechanism comprises a direct memory access (DMA) data transfer mechanism, and further wherein the data buffer receives DMA transferred data continuously such that data is transferred repeated from the ASIC to the CPU memory in a loop.

4. The networking apparatus defined in claim 1 wherein the user specified interval is received by the data engine from an application using a user interface.

5. The networking apparatus defined in claim 1 wherein the data engine receives a mapping definition from an application and includes a data mapper that uses the mapping definition to map data from the network device to the user defined format.

6. A method for use by a data engine coupled to a network device, the method comprising:
 receiving a mapping definition from an application, via a first interface of the data engine, corresponding to data to be obtained from the network device and provided to the application, the mapping definition specifying translation of network device data into a user defined data format;
 receiving a streaming definition from the application via a second interface of the data engine, the streaming definition specifying data from the network device that is to be streamed via the data engine to the application and a streaming frequency indicating how often the data is to be streamed;
 receiving a bulk transfer of a set of data created and stored on a network device using a control of the data engine responsive to the streaming definition; storing the set of data in a data buffer of the data engine; responsive to the mapping definition, presenting mapped data corresponding to the set of data to the application via a third interface.

7. The method defined in claim 6 wherein the first interface and the second user interface are the same.

8. The method defined in claim 6 wherein the streaming definition comprises a data object definition and a data buffer location for the data buffer of the data engine.

9. The method defined in claim 6 wherein receiving the bulk transfer of a set of data created and stored on a network device is performed using a DMA data transfer mechanism and the set of data is received using a DMA bus interface of the data engine.

10. The method defined in claim 6 wherein the data buffer is part of a CPU memory and the network device comprises an ASIC, and further wherein the operations of receiving a bulk transfer of a set of data created and stored on a network device using a control of the data engine responsive to the streaming definition and storing the set of data in a data buffer of the data engine are performed continuously in a loop to export data from the ASIC to the CPU memory.

11. The method defined in claim 6 wherein the third interface comprises an IP interface, a web interface, or a file system interface.

12. An article of manufacture having one or more non-transitory computer readable storage media storing instructions thereon which, when executed by a processor, cause the processor to perform a method to operate as a data engine, the method comprising:

receiving a mapping definition from an application, via a first interface of the data engine, corresponding to data to be obtained from a network device and provided to the application, the mapping definition specifying translation of network device data into a user defined data format;

receiving a streaming definition from the application via a second interface of the data engine, the streaming definition specifying data from the network device that is to be streamed via the data engine to the application and a streaming frequency indicating how often the data is to be streamed;

receiving a bulk transfer of a set of data created and stored on a network device using a control of the data engine responsive to the streaming definition; storing the set of data in a data buffer of the data engine; responsive to the mapping definition, presenting mapped data corresponding to the set of data to the application via a third interface.

13. The article of manufacture defined in claim 12 wherein the first interface is the same as the second interface.

14. The article of manufacture defined in claim 12 wherein the streaming definition comprises a data object definition and a data buffer location for the data buffer of the data engine.

15. The article of manufacture defined in claim 12 wherein receiving the bulk transfer of a set of data created and stored on a network device is performed using a DMA data transfer mechanism and the set of data is received using a DMA bus interface of the data engine.

16. The article of manufacture defined in claim 12 wherein the bulk transfer of the set of data is repeated periodically according to the time interval.

17. The article of manufacture defined in claim 12 wherein the third interface comprises a IP interface, a web interface, or a file system interface.

18. The article of manufacture defined in claim 12 wherein the data buffer is part of a CPU memory and the network device comprises an ASIC, and further wherein the operations of receiving a bulk transfer of a set of data created and stored on a network device using a control of the data engine responsive to the streaming definition and storing the set of data in a data buffer of the data engine are performed continuously in a loop to export data from the ASIC to the CPU memory.

* * * * *